US012647045B2

(12) United States Patent
Biskup et al.

(10) Patent No.: US 12,647,045 B2
(45) Date of Patent: Jun. 2, 2026

(54) THREE-LEVEL INVERTER POWER MODULE WITH MULTIPLE OPERATION MODES

(71) Applicant: Atieva, Inc., Newark, CA (US)

(72) Inventors: Richard J. Biskup, Sunnyvale, CA (US); Zheng An, Fremont, CA (US)

(73) Assignee: Atieva, Inc., Newark, CA (US)

( * ) Notice: Subject to any disclaimer, the term of this patent is extended or adjusted under 35 U.S.C. 154(b) by 190 days.

(21) Appl. No.: 18/409,279

(22) Filed: Jan. 10, 2024

(65) Prior Publication Data

US 2025/0226763 A1 Jul. 10, 2025

(51) Int. Cl.
| | |
|---|---|
| *H02M 7/483* | (2007.01) |
| *H02M 1/00* | (2007.01) |
| *H02M 1/088* | (2006.01) |
| *H02M 7/538* | (2007.01) |
| *H02M 7/5387* | (2007.01) |

(52) U.S. Cl.
CPC ....... *H02M 7/4835* (2021.05); *H02M 1/0095* (2021.05); *H02M 1/088* (2013.01); *H02M 7/53873* (2013.01)

(58) Field of Classification Search
CPC .. H02M 1/0095; H02M 1/088; H02M 1/0048; H02M 7/487; H02M 7/5387; H02M 7/53873; H02M 7/4835
See application file for complete search history.

(56) References Cited

U.S. PATENT DOCUMENTS

| | | | |
|---|---|---|---|
| 11,658,563 B2 | 5/2023 | Biskup et al. | |
| 2014/0233290 A1 | 8/2014 | Spanos et al. | |
| 2017/0317607 A1* | 11/2017 | Agirman | H02M 7/487 |
| 2019/0157987 A1* | 5/2019 | Zmood | H02M 7/487 |
| 2019/0238062 A1 | 8/2019 | Lu et al. | |
| 2020/0280267 A1* | 9/2020 | Restrepo | H02M 7/53871 |
| 2024/0291396 A1* | 8/2024 | Rosen | B60L 50/51 |

FOREIGN PATENT DOCUMENTS

| | | | | |
|---|---|---|---|---|
| CN | 117013863 A | * | 11/2023 | ............ H02M 7/487 |
| DE | 102021003941 A1 | | 2/2023 | |

OTHER PUBLICATIONS

F. Vollmaier_"Performance Evaluation of Future T-Type PFC Rectifier and Inverter Systems with Monolithic Bidirectional 600V GaN Switches" (Year: 2021).*

(Continued)

*Primary Examiner* — Sisay G Tiku
(74) *Attorney, Agent, or Firm* — Brake Hughes Bellermann LLP

(57) ABSTRACT

A three-level T-type neutral point clamp (TNPC) inverter comprises: a first direct current (DC) terminal and a second DC terminal; a first capacitor and a second capacitor electrically connected in series between the first and second DC terminals; and first, second and third circuitry legs, each of the first, second and third circuitry legs including i) switches electrically connected in series between the first and second DC terminals, and ii) a T-leg switch electrically connected between a point between the first and second capacitors and a point between the switches, wherein the T-leg switch is undersized compared to the switches.

22 Claims, 7 Drawing Sheets

(56) References Cited

OTHER PUBLICATIONS

GaN Systems Inc.: "GN001 Application Note: An Introduction to GaN Enhancement-mode HEMTs," available online at <http://gansystems.com>, Mar. 8, 2022, 19 pages.

PLECS: "Three-Phase T-Type Inverter", available online at <www.plexim.com>, 2022, 8 pages.

International Search Report and Written Opinion for PCT Application No. PCT/US2025/010760, mailed on Mar. 24, 2025, 15 pages.

Chen, et al., "T-Type 3-Level IGBT Power Module Using Authentic Reverse Block-Ing IGBT (RB-IGBT) for Renewable Energy Applications", 2013 1st International Future Energy Electronics Conference (FEEC), IEEE, Nov. 3, 2013, pp. 229-234.

Fujii, et al., "1-MW Advanced T-Type NPC Converters for Solar Power Generation System", 2013 15th European Conference on Power Electronics and Applications (EPE), IEEE, Sep. 2, 2013, 10 pages.

Taha, et al., "Efficiency Evaluation of 2L and 3L SIC-Based Traction Inverters for 400V and 800V Electric Vehicle Powertrains", 2021 IEEE Transportation Electrification Conference & Expo (ITEC), IEEE, Jun. 21, 2021, pp. 625-632.

Uemura, et al., "Comparative Evaluation of T-Type Topologies Comprising Standard and Reverse-Blocking IGBTS", 2013 IEEE Energy Conversion Congress and Exposition, IEEE, Sep. 15, 2013, 1288-1295.

* cited by examiner

200

200

500

All Si MOSFET

Hybrid switch IGBT + GaN

Hybrid switch
IGBT + bidirectional GaN

800

All GaN HEMTs

900

All SiC MOSFET

THREE-LEVEL INVERTER POWER MODULE WITH MULTIPLE OPERATION MODES

TECHNICAL FIELD

This document relates to a three-level inverter power module with multiple operation modes.

BACKGROUND

For high-power applications, three-level inverters may be preferred to their two-level counterpart since they can provide reduced harmonics, improved electro-magnetic interference, and increased efficiency. Neutral point clamp (NPC) and T-type neutral point clamp (TNPC) inverters are two three-level inverter candidates used for solar inverters, motor drives, etc.

Three-phase three-level NPC inverters can generate the phase voltages at three voltage levels, $$+\frac{V_{dc}}{2},$$

0 and $$-\frac{V_{dc}}{2},$$

instead of just the $+V_{dc}$ and 0 for two-level inverters, where $V_{dc}$ is the voltage of a direct current (DC) bus. Commercially available three-level NPC power modules often pack four insulated-gate bipolar transistors (IGBTs) and six diodes for each phase into one package for a modular design. Thus, three power modules are required to implement a three-phase three-level NPC inverter.

A three-phase three-level TNPC inverter can include four IGBTs and four diodes into one package for each phase. This slightly different approach is also capable of the same three voltage levels seen for the NPC topology.

Currently, commercial three-level inverter modules feature the same die area (resulting in same current rating) in all switches to achieve high efficiency across the whole load range, especially at high power. Each switch can be a silicon (Si) IGBT, a silicon-carbide (SiC) metal-oxide-semiconductor field-effect transistor (MOSFET), or a gallium-nitride (GaN) high electron mobility transistor (HEMT).

SUMMARY

In a first aspect, a three-level T-type neutral point clamp (TNPC) inverter comprises: a first direct current (DC) terminal and a second DC terminal; a first capacitor and a second capacitor electrically connected in series between the first and second DC terminals; and first, second and third circuitry legs, each of the first, second and third circuitry legs including i) switches electrically connected in series between the first and second DC terminals, and ii) a T-leg switch electrically connected between a point between the first and second capacitors and a point between the switches, wherein the T-leg switch is undersized compared to the switches.

Implementations can include any or all of the following features. The T-leg switch is undersized compared to the switches by the T-leg switch having less die area than each of the switches. The die area of the T-leg switch is less than half of the die area of each of the switches. The die area of the T-leg switch is at most about 20 percent of the die area of each of the switches. The T-leg switch is undersized compared to the switches by the T-leg switch having a current rating that is lower than a current rating of each of the switches. The current rating of the T-leg switch is less than half of the current rating of each of the switches. The current rating of the T-leg switch is at most about 20 percent of the current rating of each of the switches. Each of the switches is an insulated-gate bipolar transistor (IGBT). The T-leg switch comprises at least two T-leg switches arranged to perform blocking. Each of the two T-leg switches is an IGBT. Each of the two T-leg switches is a high electron mobility transistor (HEMT). The T-leg switch comprises a bidirectional HEMT. The T-leg switch is a GaN HEMT. Each of the switches is a metal-oxide-semiconductor field-effect transistor (MOSFET). The T-leg switch comprises at least two T-leg switches arranged to perform blocking, and wherein the two T-leg switches are MOSFETs. Each of the switches is a silicon MOSFET. Each of the switches is a silicon-carbide MOSFET. Each of the switches is a HEMT. The T-leg switch is a HEMT. The T-leg switch comprises at least two T-leg switches arranged to perform blocking, and wherein the two T-leg switches are HEMTs. The T-leg switch is undersized compared to the switches by the T-leg switch being implemented using fewer dies, or being implemented using smaller dies, or both, than each of the switches.

In a second aspect, an electric vehicle comprises: an energy source; an electric motor; a three-level T-type neutral point clamp (TNPC) inverter for the electric motor; and circuitry controlling the three-level TNPC inverter to operate in at least: a three-level operating mode in which T-leg switches of the three-level TNPC inverter are active; and a two-level operating mode in which the T-leg switches of the three-level TNPC inverter are off.

Implementations can include any or all of the following features. The circuitry is configured to control the three-level TNPC inverter to operate in the three-level operating mode or in the two-level operating mode based on at least one threshold for current from the three-level TNPC inverter. The threshold is based on a current rating of the T-leg switches. The circuitry is configured to control the three-level TNPC inverter to operate in the three-level operating mode based on the current from the three-level TNPC inverter not exceeding the threshold. The circuitry is configured to control the three-level TNPC inverter to operate in the two-level operating mode based on the current from the three-level TNPC inverter exceeding the threshold. The circuitry is configured to dynamically change the threshold during operation of the three-level TNPC inverter. The three-level TNPC inverter further includes: a first direct current (DC) terminal and a second DC terminal; a first capacitor and a second capacitor electrically connected in series between the first and second DC terminals; and first, second and third circuitry legs, each of the first, second and third circuitry legs including switches electrically connected in series between the first and second DC terminals, wherein each of the first, second and third circuitry legs includes at least a corresponding one of the T-leg switch, wherein in each of the first, second and third circuitry legs the T-leg switch is electrically connected between a point between the first and second capacitors and a point between the switches. Each of the T-leg switches is undersized compared to the switches. Each of the T-leg switches is undersized compared to the switches by the T-leg switch having less die area than each of the switches. The die area of the T-leg switch is less than half of the die area of each of the switches. The die area of the T-leg switch is at most about 20 percent of the die area of each of the switches. Each of the T-leg switches is undersized compared to the switches by the T-leg switch having a lower current rating than each of the switches. The current rating of the T-leg switch is less than half of the current rating of each of the switches. The current rating of the T-leg switch is at most about 20 percent of the current rating of each of the switches. The T-leg switch is undersized compared to the switches by the T-leg switch being implemented using fewer dies, or being implemented using smaller dies, or both, than each of the switches.

BRIEF DESCRIPTION OF DRAWINGS

Like reference symbols in the various drawings indicate like elements.

DETAILED DESCRIPTION

Figure 1:
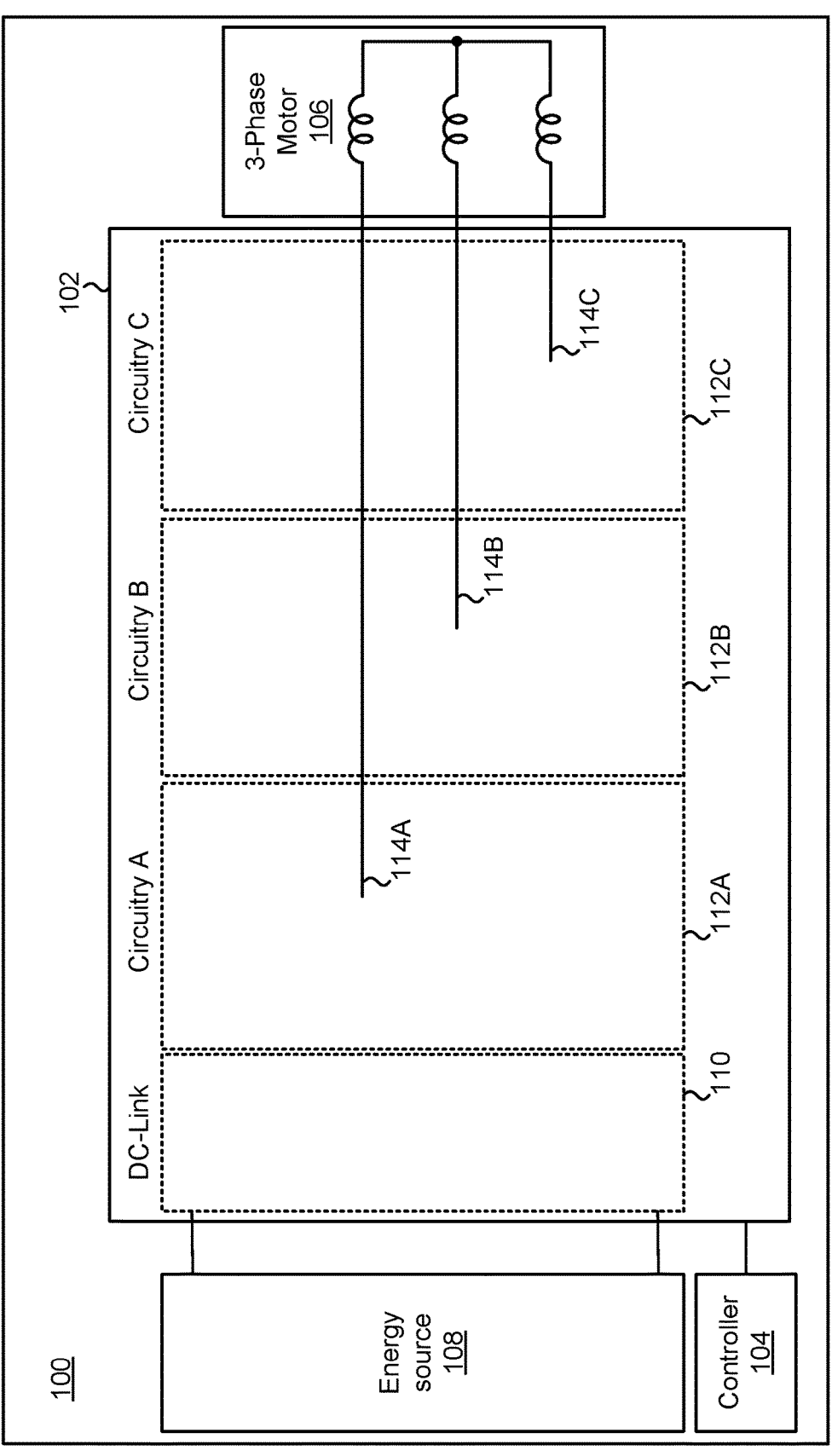
FIG. 1 schematically shows an example of an electric vehicle with a three-level power inverter module.

This document describes examples of systems and techniques for providing a three-level inverter power module having multiple operation modes. The three-level inverter power module can operate in a first mode (e.g., a three-level mode) at relatively low current levels (e.g., at lighter loads). The three-level inverter power module can operate in a second mode (e.g., a two-level mode) at relatively high current levels (e.g., at higher loads). The three-level inverter power module can be implemented using a reduced die area compared to a three-level inverter power module that operates only in a single mode (e.g., a three-level mode) at all loads. In some implementations, when designing the three-level inverter power module one or more T-leg switches can be deliberately undersized compared to a standard three-level inverter. In some implementations, this allows the die area of a three-level inverter power module for a battery electric vehicle to be reduced. A reduction in the die area for a given power level of the inverter lowers the system size and cost when compared with the current practices of making a three-level T-type inverter. As another example, when fewer dies are created in a semiconductor device according to the present subject matter, the building can be made easier, particularly with regard to solving the geometric problems of laying out a custom semiconductor module, including the arrangement of wires, providing sufficient cooling, and managing loop inductance. The three-level inverter power module can drop out of the three-level operation mode (and instead operate in a two-level mode) when the load (e.g., the current to be delivered by the three-level inverter power module) exceeds the rating of the T-leg switch(es).

The drive system of an electric vehicle has different characteristics compared with other inverter applications such as a grid tied inverter for a solar photovoltaic array or a variable frequency drive for a pump motor. The electric-vehicle drive system typically has very large peak power to average power ratio. For example, the drive unit of an electric vehicle can be capable of over 400 kilowatt (kW) of power yet may require only about 10-15 kW when traveling at highway speed, a ratio of about 30:1 or higher. Therefore, light load efficiency may be a significant factor (e.g., the most important factor) determining driving range in a drive cycle (e.g., in the EPA drive cycle created by the United States Environmental Protection Agency).

In the present subject matter, a three-level TNPC inverter can operate in at least two modes without significant compromise in vehicle efficiency. The inverter can use three-level operation at light-load conditions and can use two-level operation at heavy-load conditions up to peak power. In this way, the T-leg switches will see less current than the remaining switches in the power stage. This allows the output stage or power module to be manufactured with smaller or fewer dies for reduced current rating, lowering the system size and cost of three-level inverter power modules.

Operating the three-level TNPC inverter in three-level mode under light-load conditions decreases voltage distortion and harmonics. For example, more detailed voltage steps can help better approximate a desired sine wave. This decreases power losses in all switches and high-frequency losses in the electric motor, leading to increased system efficiency. In this mode, the T-leg switches as well as the switches in the half-bridge of the three-level TNPC inverter carry only a portion of the maximum current that is required at peak power conditions. Moreover, the half-bridge switches only handle half of the DC bus voltage, $$\frac{V_{dc}}{2}.$$

Under heavy-load conditions up to peak power, the three-level TNPC inverter can instead operate in two-level mode. This may correspond to the operation of a conventional three-phase two-level inverter comprised of three half-bridge modules. In this mode, the T-leg switches are turned off at all times, carrying no current at all. The half-bridge switches, on the other hand, carry the full current and withstand the full DC bus voltage $V_{dc}$. This mode may have the same efficiency as a conventional two-level inverter.

Examples described herein refer to a switch. As used herein, a switch is an electrical component that can connect or disconnect two or more conducting paths in an electrical circuit. For example, the switch can interrupt the current or allow the current to flow, based on the setting of the switch. In some implementations, a switch can include one or more semiconductor devices. For example, a switch can include a transistor. In some implementations, a switch includes a metal-oxide-semiconductor field-effect transistor (MOSFET). For example, a switch can include a silicon MOSFET silicon-carbide MOSFET. As another example, a switch can include a silicon MOSFET. In some implementations, a switch includes an insulated-gate bipolar transistor (IGBT). In some implementations, a switch includes a high electron mobility transistor (HEMT). For example, a switch can include a GaN HEMT. Other switches can be used.

Examples described herein mention circuitry. As used herein, circuitry includes one or more electronic circuits configured to perform one or more operations. In some implementations, circuitry can include a logic circuit of multiple devices. Such devices can include, but are not limited to logic gates (e.g., gates that implement one or more of logical NOT, AND, OR, NOT-AND (NAND), NOT-OR (NOR), or exclusive-OR (XOR) operations), and/or flip-flops. In some implementations, circuitry can include a discrete circuit. In some implementations, circuitry can include an integrated circuit. For example, circuitry can include a field-programmable gate array (FPGA). A circuit can include a processor (e.g., a general-purpose processor or a special-purpose processor) that is configured for reading and executing instructions stored in software. As used herein, software includes, but is not limited to, firmware.

Examples described herein refer to a three-level TNPC inverter. A three-level TNPC inverter is a device that includes circuitry that can convert direct current (DC) to alternating current (AC), wherein in one or more modes of operation the AC has at least three voltage levels. The three-level TNPC inverter can be controlled to operate in the three-level mode under certain circumstances (e.g., at relatively low load levels) and can be controlled to operate in a two-level mode under other circumstances (e.g., at relatively high load levels). The three-level TNPC inverter has switches of a half-bridge arranged in series between DC terminals, and also has at least one T-leg switch connected between a neutral point of a DC link and a point between the switches.

Examples described herein refer to a T-leg switch that is undersized compared to one or more switches. A T-leg switch that is undersized compared to a switch is lesser than the switch in one or more aspects. The T-leg switch can have less die area than the switch. The T-leg switch can have a lower current rating than the switch.

Examples described herein refer to a vehicle. A vehicle is a machine that transports passengers or cargo, or both. A vehicle can have one or more motors using at least one type of fuel or other energy source (e.g., electricity). An electric vehicle has at least one electric motor. The electric vehicle can have one or more additional motors, the additional motor(s) can be electric or non-electric. Examples of vehicles include, but are not limited to, cars, trucks, and buses. The number of wheels can differ between types of vehicles, and one or more (e.g., all) of the wheels can be used for propulsion of the vehicle.

Examples described herein refer to an electric motor. As used herein, an electric motor includes any type of electric motor driven by an inverter. Such electric motors include, but are not limited to, a permanent-magnet motor, an induction motor, a synchronous motor, an axial flux motor, a reluctance motor, or a synchronous reluctance motor.

FIG. 1 schematically shows an example of an electric vehicle 100 with a three-level power inverter module 102. Some aspects of the electric vehicle 100 are not shown for simplicity, including but not limited to body, passenger cabin, chassis, wheels, and thermal system. The electric vehicle 100 and/or the three-level power inverter module 102 can be used with one or more other examples described elsewhere herein.

The electric vehicle 100 includes a controller 104 electrically coupled to the three-level power inverter module 102. The electric vehicle 100 includes a load 106. In some implementations, the load 106 includes an electric motor, wherein the controller 104 causes the three-level power inverter module 102 to drive the electric motor using energy from an energy source 108 (including, but not limited to, one or more electrochemical cells). The load 106 can be a multi-phase (e.g., three-phase) electric motor, to name just one example.

The controller 104 is configured for controlling the three-level power inverter module 102 to operate in any of at least two modes. In some implementations, a first mode is a three-level mode and a second mode is a two-level mode. For example, the controller 104 can generate pulse width modulation (PWM) signals for controlling the three-level power inverter module 102. The controller 104 can include a processor executing instructions stored in software, or can include a logic circuit (e.g., an FPGA), to name just two examples.

The three-level power inverter module 102 here includes a DC-link portion 110, and circuitry legs 112A, 112B, and 112C, respectively. The DC-link portion 110 can include DC terminals (e.g., a positive terminal and a negative terminal), and at least one capacitor electrically connected between the DC terminals. The DC terminals are electrically connected to the energy source 108.

The circuitry legs 112A, 112B, and 112C can be associated with respective phases of the load 106. In some implementations, a winding 114A connects the circuitry leg 112A and the load 106 to each other. For example, the winding 114A can be referred to as Phase A of the load 106. In some implementations, a winding 114B connects the circuitry leg 112B and the load 106 to each other. For example, the winding 114B can be referred to as Phase B of the load 106. In some implementations, a winding 114C connects the circuitry leg 112C and the load 106 to each other. For example, the winding 114C can be referred to as Phase C of the load 106.

Figure 2:
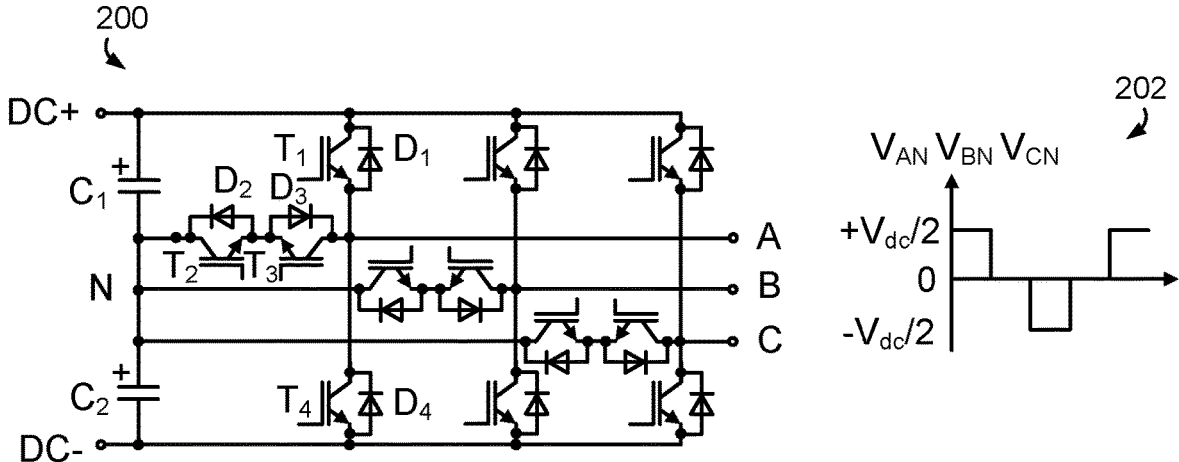
FIG. 2 shows an example of a three-level T-type neutral point clamp (TNPC) inverter that can be used as the three-level power inverter module of FIG. 1, the three-level TNPC inverter being operated in a first mode.

FIG. 2 shows an example of a three-level TNPC inverter 200 that can be used as the three-level power inverter module 102 of FIG. 1, the three-level TNPC inverter 200 being operated in a first mode. The three-level TNPC inverter 200 can be used with one or more other examples described elsewhere herein. The three-level TNPC inverter 200 includes power stages (e.g., each corresponding to a respective one of the circuitry legs 112A-112C in FIG. 1).

Each of the power stages can include switches and one or more other components. Here, a first power stage includes switches $T_1$ and $T_4$, respectively. The switches $T_1$ and $T_4$ can be referred to as the half-bridge switches. A collector of the switch $T_1$ is electrically connected to a DC terminal DC+ (e.g., a positive DC terminal). An emitter of the switch $T_1$ is electrically connected to the collector of the switch $T_4$. A gate of the switch $T_1$ is electrically connected to a gate driver. In some implementations, the gate driver of the switch $T_1$ can be electrically connected to the controller 104 in FIG. 1. For example, the controller 104 provides a PWM signal to the switch $T_1$ by way of the gate driver. The switch $T_1$ here also includes a body diode $D_1$ that is electrically connected to the collector and the emitter of the switch $T_1$.

An emitter of the switch $T_4$ is electrically connected to a DC terminal DC− (e.g., a negative DC terminal). A collector of the switch $T_4$ is electrically connected to the emitter of the switch $T_1$. A gate of the switch $T_4$ is electrically connected to a gate driver. In some implementations, the gate driver of the switch $T_4$ can be electrically connected to the controller

104. For example, the controller 104 provides a PWM signal to the switch $T_4$ by way of the gate driver. The switch $T_4$ here also includes a body diode $D_4$ that is electrically connected to the collector and the emitter of the switch $T_4$.

Here, the first power stage includes T-leg switches $T_2$ and $T_3$. The T-leg switches $T_2$ and $T_3$ are electrically connected between a point N, located between capacitors $C_1$ and $C_2$ of a DC link, and a point between the switches $T_1$ and $T_4$. The T-leg switches $T_2$ and $T_3$ are here arranged opposite to each other (the emitter of the T-leg switch $T_2$ is electrically connected to the emitter of the T-leg switch $T_3$). This can provide blocking in the T-leg between the half-bridge and the DC link. The T-leg switches $T_2$ and $T_3$ are undersized compared to the switches $T_1$ and $T_4$ (e.g., as schematically illustrated by being shown with a smaller size). The T-leg switches $T_2$ and $T_3$ can be undersized compared to the switches $T_1$ and $T_4$ by having less die area than each of the switches $T_1$ and $T_4$. In some implementations, the die area of each of the T-leg switches $T_2$ and $T_3$ is less than half of the die area of each of the switches $T_1$ and $T_4$. For example, the die area of each of the T-leg switches $T_2$ and $T_3$ can be at most about 20 percent of the die area of each of the switches $T_1$ and $T_4$. The T-leg switches $T_2$ and $T_3$ can be undersized compared to the switches $T_1$ and $T_4$ by having a current rating that is lower than a current rating of each of the switches $T_1$ and $T_4$. In some implementations, the current rating of each of the T-leg switches $T_2$ and $T_3$ is less than half of the current rating of each of the switches $T_1$ and $T_4$. For example, the current rating of each of the T-leg switches $T_2$ and $T_3$ can be at most about 20 percent of the current rating of each of the switches $T_1$ and $T_4$. Each of the switches $T_1$ and $T_4$ and the T-leg switches $T_2$ and $T_3$ is here shown as an IGBT for illustrative purposes only. For example, each of the switches can be a silicon IGBT. Other switches can be used in the three-level TNPC inverter 200.

As such, the first power stage can be associated with phase A of the electric motor. The three-level TNPC inverter 200 also includes second and third power stages to form the phases B and C, respectively. The second and third power stages have half-bridge switches, and T-leg switches, in analogy with those of the first power stage. As mentioned, the three-level TNPC inverter 200 as shown is being operated in the first mode, which can involve a three-level operation. In the three-level operation, the T-leg switches $T_2$ and $T_3$ can be active. As such, the three-level TNPC inverter 200 outputs AC with three levels of voltage. A diagram 202 indicates voltage (on a vertical axis) as a function of time (on a horizontal axis). The diagram 202 shows that three levels of voltage are generated. For example, this mode of operation can be used when the current is below a threshold (e.g., at light loads). The diagram 202 reflects that the maximum voltage is $$\frac{V_{dc}}{2}.$$

Figure 3:
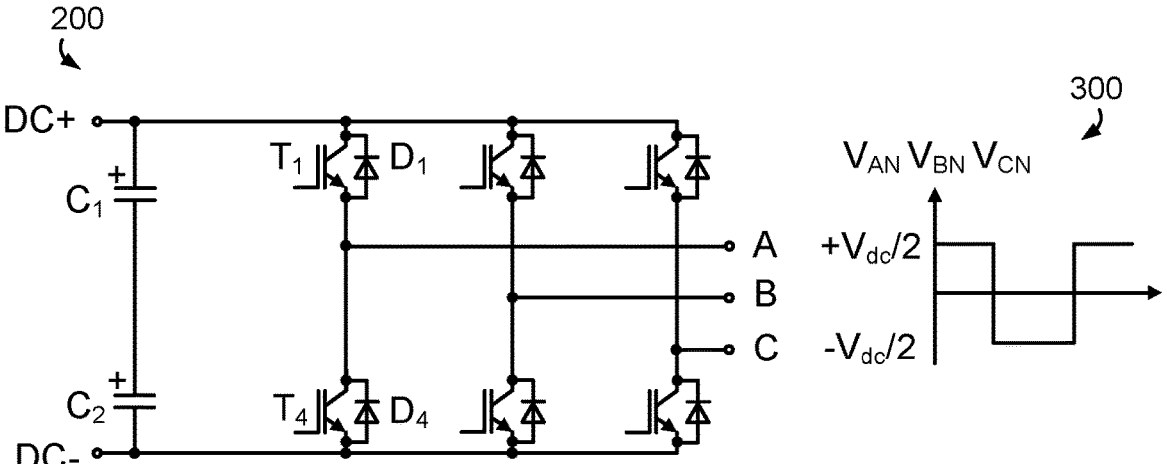
FIG. 3 shows an example of the three-level TNPC inverter of FIG. 2 being operated in a second mode.

At higher loads, a different mode can be used. FIG. 3 shows an example of the three-level TNPC inverter 200 of FIG. 2 being operated in a second mode. In the second mode, the T-leg switches $T_2$ and $T_3$ can be off at all times, in each of the power stages. As such, the T-leg switches $T_2$ and $T_3$ and their counterparts in the other power stages are here not shown for simplicity. The second mode can involve a two-level operation. As such, the three-level TNPC inverter 200 outputs AC with two levels of voltage. A diagram 300 indicates voltage (on a vertical axis) as a function of time (on a horizontal axis). The diagram 300 shows that two levels of voltage are generated. For example, this mode of operation can be used when the current is above a threshold (e.g., at high loads). The diagram 300 reflects that the maximum voltage is $$\frac{V_{dc}}{2}.$$

Figure 4:
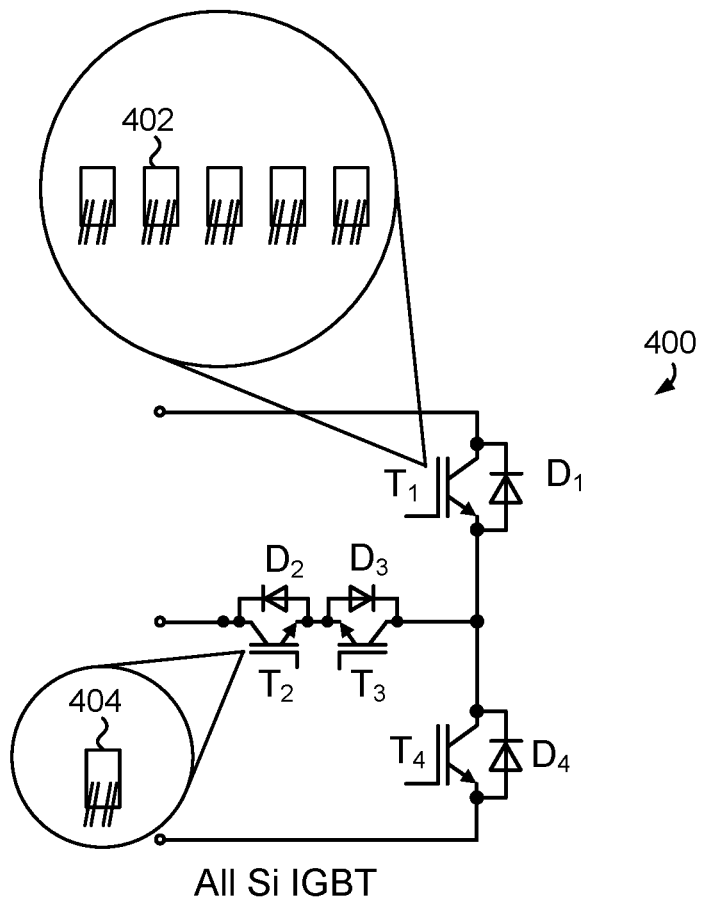
FIG. 4 shows an example of part of a three-level TNPC inverter having IGBTs.

FIG. 4 shows an example of part of a three-level TNPC inverter 400 having IGBTs. The three-level TNPC inverter 400 can be used with one or more other examples described elsewhere herein. The three-level TNPC inverter 400 includes power stages (e.g., each corresponding to a respective one of the circuitry legs 112A, 112B, and 112C in FIG. 1), only one of which is shown for simplicity. That is, the power stage includes switches $T_1$ and $T_4$, respectively, between DC terminals, and also T-leg switches $T_2$ and $T_3$. Here, each of the switches is an IGBT. For example, the switches can be silicon IGBTs.

The three-level TNPC inverter 400 can operate in at least two modes. Table 1 below shows examples of voltage levels and current levels for the respective switches in the respective operation modes.

TABLE 1

| Switch | Light Load Condition (three-level mode) | Heavy Load Condition up to Peak Power (two-level mode) |
|---|---|---|
| $T_1$ | $\frac{V_{dc}}{2}$, | $V_{dc}, I_{pk}$ |
| $T_2$ | | OFF |
| $T_3$ | $0.2 * I_{pk}$ | OFF |
| $T_4$ | | $V_{dc}, I_{pk}$ |

Table 1 shows that the switches $T_1$ and $T_4$ are subject to the full peak current ($I_{pk}$) and the full DC voltage ($V_{dc}>$), whereas the T-leg switches $T_2$ and $T_3$ are only subject to a fraction of the full peak current (e.g., $0.2*I_{pk}$) and less than the full DC voltage $$\left(\text{e.g., } \frac{V_{dc}}{2}\right).$$

This can be taken into account in designing the architecture of the three-level TNPC inverter 400, for example as will now be described.

The T-leg switches $T_2$ and $T_3$ can be undersized compared to the switches $T_1$ and $T_4$. In some implementations, each of the switches $T_1$ and $T_4$, while illustrated as a single switch in the present drawing, can be implemented in the actual semiconductor device using multiple parallel dies. Here, the switch $T_1$ is shown in an enlargement as being implemented using five parallel instances of a die 402. That is, the switches $T_1$ and $T_4$ here together require ten dies, corresponding to a particular amount of die area being used in the semiconductor device.

If the three-level TNPC inverter 400 were being designed in a conventional way beginning with a two-level inverter design, then each of the T-leg switches that is to be added to provide a T-type neutral point clamp would likely have been implemented using the same number of dies as each of the switches $T_1$ and $T_4$. In other words, each of the T-leg switches $T_2$ and $T_3$ would have required five additional dies in the design, for a total of ten added dies. That is, in extending the two-level inverter design to provide a T-type neutral point clamp, the number of dies would have increased from ten to twenty; that is, doubled.

By contrast, in the present subject matter the three-level TNPC inverter 400 is designed while taking into account Table 1, which indicates that the T-leg switches $T_2$ and $T_3$ need not have as high a current rating as each of the switches $T_1$ and $T_4$. The three-level TNPC inverter 400 can therefore be designed using less die area for each of the T-leg switches $T_2$ and $T_3$ than for the switches $T_1$ and $T_4$. Here, the switch $T_2$ is shown in an enlargement as being implemented using a single instance of a die 404. The die 404 can be functionally identical or equivalent to the die 402 (e.g., each of them can be an IGBT). That is, the T-leg switches $T_2$ and $T_3$ here together require only two dies, corresponding to a reduced amount of die area being occupied in the semiconductor device. The T-leg switches $T_2$ and $T_3$ are arranged opposite each other to provide blocking. As a result, in extending the two-level inverter design to provide a T-type neutral point clamp according to the present subject matter, the number of dies increases from ten to only twelve; that is, a significantly less extensive increase than the doubling of die area mentioned above. This lowers the material costs because less die area is being used, and also reduces the complexity of design which can further simplify the manufacturing. Each of the switches $T_1$ and $T_4$ and the T-leg switches $T_2$ and $T_3$ is here shown as an IGBT for illustrative purposes only. For example, each of the switches can be a silicon IGBT. Other switches can be used in the three-level TNPC inverter 400.

In the above example, the T-leg switches $T_2$ and $T_3$ are undersized by being implemented with fewer dies than the switches $T_1$ and $T_4$. Also or instead, another way of reducing total die area can be used. In some implementations, the T-leg switches $T_2$ and $T_3$ can be implemented using one or more dies having a lower current rating (e.g., being smaller) than the respective die(s) of the switches $T_1$ and $T_4$. For example, the die 404 can then have a lower current rating than the one or more instances of the die 402. That is, total die area can be reduced either by using fewer dies in the T-leg, or by using smaller dies in the T-leg, or both.

Figure 5:
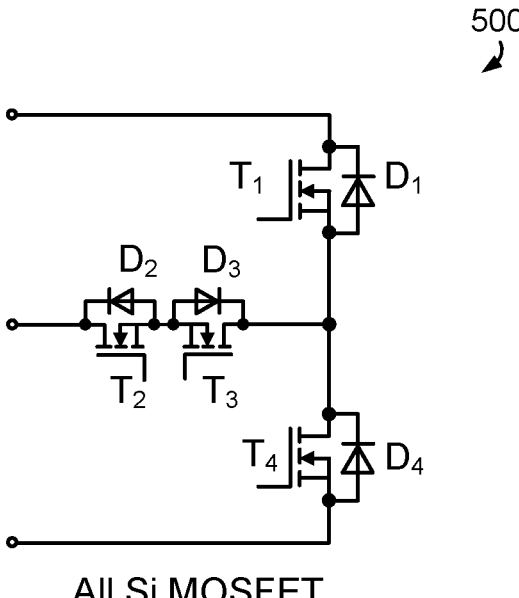
FIG. 5 shows an example of part of a three-level TNPC inverter having MOSFETs.

FIG. 5 shows an example of part of a three-level TNPC inverter 500 having MOSFETs. The three-level TNPC inverter 500 can be used with one or more other examples described elsewhere herein. The three-level TNPC inverter 500 includes power stages (e.g., each corresponding to a respective one of the circuitry legs 112A, 112B, and 112C in FIG. 1), only one of which is shown for simplicity. That is, the power stage includes switches $T_1$ and $T_4$, respectively, between DC terminals, and also T-leg switches $T_2$ and $T_3$. Here, each of the switches is a MOSFET. For example, the switches can be silicon MOSFETs.

The three-level TNPC inverter 500 can operate in at least two modes, in analogy with the three-level TNPC inverter 400 of FIG. 4. For reasons similar to those described above, the T-leg switches $T_2$ and $T_3$ of the three-level TNPC inverter 500 can be undersized compared to the switches $T_1$ and $T_4$. In some implementations, the T-leg switches $T_2$ and $T_3$ of the three-level TNPC inverter 500 use less die area, and/or have lower current rating, than the switches $T_1$ and $T_4$. Each of the switches $T_1$ and $T_4$ and the T-leg switches $T_2$ and $T_3$ is here shown as a MOSFET for illustrative purposes only. Other switches can be used in the three-level TNPC inverter 500.

Figure 6:
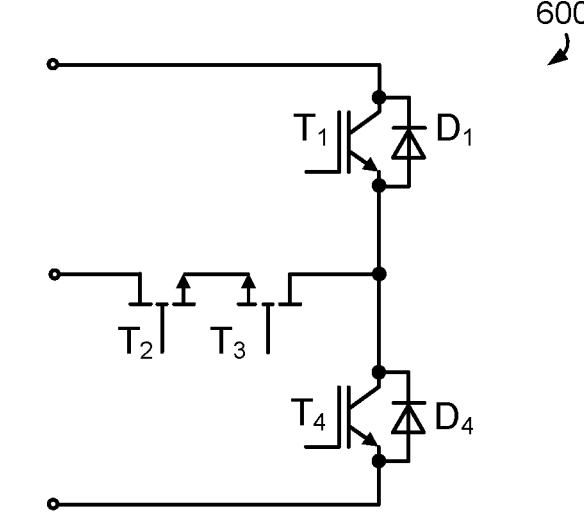
FIG. 6 shows an example of part of a three-level TNPC inverter having a hybrid switch.

FIG. 6 shows an example of part of a three-level TNPC inverter 600 having a hybrid switch. The three-level TNPC inverter 600 can be used with one or more other examples described elsewhere herein. The three-level TNPC inverter 600 includes power stages (e.g., each corresponding to a respective one of the circuitry legs 112A, 112B, and 112C in FIG. 1), only one of which is shown for simplicity. That is, the power stage includes switches $T_1$ and $T_4$, respectively, between DC terminals, and also T-leg switches $T_2$ and $T_3$. Here, each of the switches $T_1$ and $T_4$ is an IGBT. Here, each of the T-leg switches $T_2$ and $T_3$ is a HEMT. For example, the T-leg switches $T_2$ and $T_3$ can be GaN HEMTs.

The three-level TNPC inverter 600 can operate in at least two modes, in analogy with the three-level TNPC inverter 400 of FIG. 4. For reasons similar to those described above, the T-leg switches $T_2$ and $T_3$ of the three-level TNPC inverter 600 can be undersized compared to the switches $T_1$ and $T_4$. In some implementations, the T-leg switches $T_2$ and $T_3$ of the three-level TNPC inverter 600 use less die area, and/or have lower current rating, than the switches $T_1$ and $T_4$. Each of the switches $T_1$ and $T_4$ is here shown as an IGBT, and the T-leg switches $T_2$ and $T_3$ as a HEMT, for illustrative purposes only. Other switches can be used in the three-level TNPC inverter 600.

Figure 7:
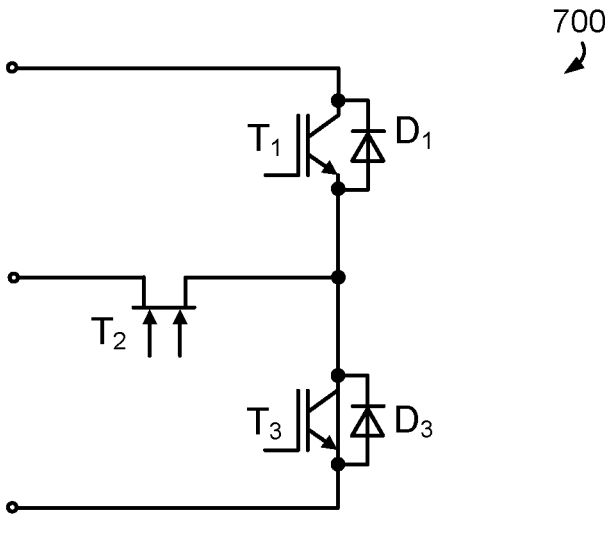
FIG. 7 shows another example of part of a three-level TNPC inverter having a hybrid switch.

FIG. 7 shows another example of part of a three-level TNPC inverter 700 having a hybrid switch. The three-level TNPC inverter 700 can be used with one or more other examples described elsewhere herein. The three-level TNPC inverter 700 includes power stages (e.g., each corresponding to a respective one of the circuitry legs 112A, 112B, and 112C in FIG. 1), only one of which is shown for simplicity. That is, the power stage includes switches $T_1$ and $T_3$, respectively, between DC terminals, and also a bidirectional T-leg switch $T_2$. Here, each of the switches $T_1$ and $T_3$ is an IGBT. Here, the bidirectional T-leg switch $T_2$ is a bidirectional HEMT. For example, the bidirectional T-leg switch $T_2$ can be a bidirectional GaN HEMT.

The three-level TNPC inverter 700 can operate in at least two modes, in analogy with the three-level TNPC inverter 400 of FIG. 4. For reasons similar to those described above, the bidirectional T-leg switch $T_2$ of the three-level TNPC inverter 700 can be undersized compared to the switches $T_1$ and $T_3$. In some implementations, the bidirectional T-leg switch $T_2$ of the three-level TNPC inverter 700 uses less die area, and/or have lower current rating, than the switches $T_1$ and $T_3$. Each of the switches $T_1$ and $T_3$ is here shown as an IGBT, and the bidirectional T-leg switch $T_2$ as a bidirectional GaN HEMT, for illustrative purposes only. Other switches can be used in the three-level TNPC inverter 700.

Figure 8:
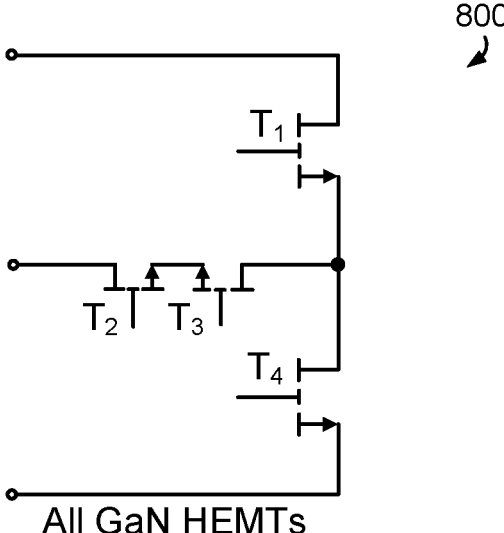
FIG. 8 shows an example of part of a three-level TNPC inverter having HEMTs.

FIG. 8 shows an example of part of a three-level TNPC inverter 800 having HEMTs. The three-level TNPC inverter 800 can be used with one or more other examples described elsewhere herein. The three-level TNPC inverter 800 includes power stages (e.g., each corresponding to a respective one of the circuitry legs 112A, 112B, and 112C in FIG. 1), only one of which is shown for simplicity. That is, the power stage includes switches $T_1$ and $T_4$, respectively, between DC terminals, and also T-leg switches $T_2$ and $T_3$. Here, each of the switches $T_1$ and $T_4$, and the T-leg switches $T_2$ and $T_3$, is a HEMT. For example, the switches can be GaN HEMTs.

The three-level TNPC inverter 800 can operate in at least two modes, in analogy with the three-level TNPC inverter 400 of FIG. 4. For reasons similar to those described above, the T-leg switches $T_2$ and $T_3$ of the three-level TNPC inverter 800 can be undersized compared to the switches $T_1$ and $T_4$. In some implementations, the T-leg switches $T_2$ and $T_3$ of the three-level TNPC inverter 800 use less die area, and/or have lower current rating, than the switches $T_1$ and $T_4$. Each of the switches is here shown as a HEMT for illustrative purposes only. Other switches can be used in the three-level TNPC inverter 800.

Figure 9:
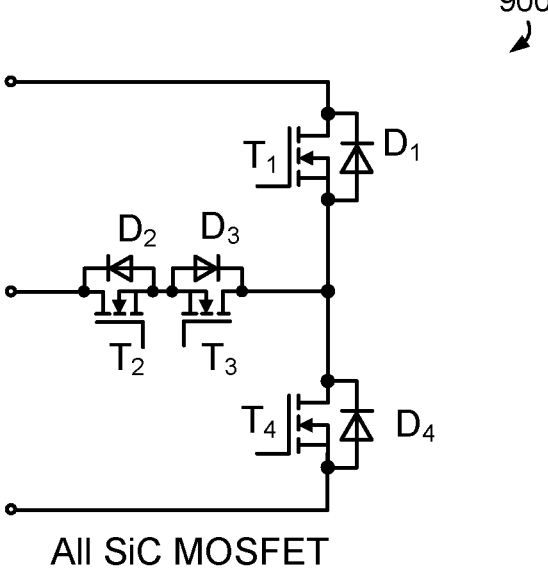
FIG. 9 shows another example of part of a three-level TNPC inverter having MOSFETs.

FIG. 9 shows another example of part of a three-level TNPC inverter 900 having MOSFETs. The three-level TNPC inverter 900 can be used with one or more other examples described elsewhere herein. The three-level TNPC inverter 900 includes power stages (e.g., each corresponding to a respective one of the circuitry legs 112A, 112B, and 112C in FIG. 1), only one of which is shown for simplicity. That is, the power stage includes switches T$_1$ and T$_4$, respectively, between DC terminals, and also T-leg switches T$_2$ and T$_3$. Here, each of the switches is a silicon-carbide MOSFET.

The three-level TNPC inverter 900 can operate in at least two modes, in analogy with the three-level TNPC inverter 400 of FIG. 4. For reasons similar to those described above, the T-leg switches T$_2$ and T$_3$ of the three-level TNPC inverter 900 can be undersized compared to the switches T$_1$ and T$_4$. In some implementations, the T-leg switches T$_2$ and T$_3$ of the three-level TNPC inverter 900 use less die area, and/or have lower current rating, than the switches T$_1$ and T$_4$. Each of the switches T$_1$ and T$_4$ and the T-leg switches T$_2$ and T$_3$ is here shown as a silicon-carbide MOSFET for illustrative purposes only. Other switches can be used in the three-level TNPC inverter 900.

Figure 10:
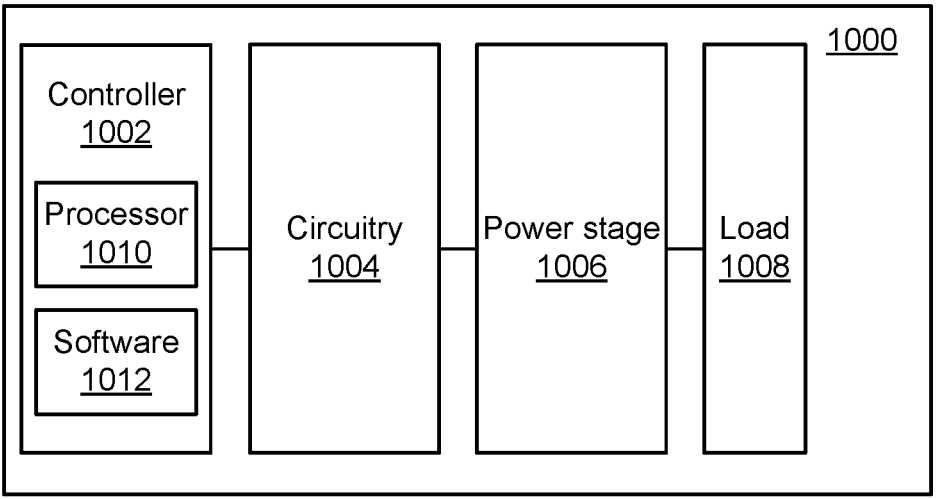
FIG. 10 schematically shows another example of an electric vehicle.

FIG. 10 schematically shows another example of an electric vehicle 1000. The electric vehicle 1000 can be used with one or more other examples described elsewhere herein. The electric vehicle 1000 illustrates some possible approaches for controlling switches in the present subject matter.

The electric vehicle 1000 includes a controller 1002, circuitry 1004, a power stage 1006, and a load 1008 (e.g., an electric motor, such as a three-phase electric motor). For example, the controller 1002 and the circuitry 1004 can form the controller 104 (FIG. 1). The power stage 1006 can include the circuitry legs 112A, 112B, and 112C (FIG. 1).

The controller 1002 can include a processor 1010 (including, but not limited to, a microprocessor) that is configured to access machine-readable instructions stored in software 1012 and perform operations accordingly. In some implementations, the controller 1002 is a motor controller for a drive unit of an electric vehicle. In operation, the controller 1002 can receive inputs that allow it to monitor aspects relating to the power stage 1006, including, but not limited to, current level, voltage level, and the requested torque for the power stage 1006. The controller 1002 can output, on a cycle-by-cycle basis, PWM signals suitable for controlling the power stage 1006.

The PWM signals generated by the controller 1002 can correspond to operation of the power stage 1006 in either of at least two modes. In some implementations, the controller 1002 can operate based on at least one threshold regarding the current output by the power stage 1006. For example, when the current does not exceed the threshold, the controller 1002 can operate the power stage 1006 in a three-level mode (e.g., at low loads). As another example, when the current does exceed the threshold, the controller 1002 can instead operate the power stage 1006 in a two-level mode (e.g., at high loads). More than one threshold can be used. The controller 1002 can dynamically change the threshold for the current. In some implementations, the controller 1002 uses one or more sensor outputs of the electric vehicle in setting the threshold. For example, temperature of a power electronics coolant can be used.

The circuitry 1004 is here separate from the controller 1002 in this example. In some implementations, the circuitry

1004 includes an arrangement of logic gates configured to perform its function(s). For example, the circuitry 1004 can include an FPGA. In some implementations, the circuitry 1004 can be used as a complement to some of the functionality or operations performed by the controller 1002. For example, safety restrictions can be evaluated and enforced using the circuitry 1004. The circuitry 1004 can be configured for synthesizing what the switches of the power stage 1006 should be doing. The circuitry 1004 can monitor system current, voltage, and voltage direction. Using the circuitry 1004 can reduce the computational overhead of the controller 1002. In some implementations, the circuitry 1004 can be omitted and the controller 1002 can directly control the power stage 1006.

The terms "substantially" and "about" used throughout this Specification are used to describe and account for small fluctuations, such as due to variations in processing. For example, they can refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A three-level T-type neutral point clamp (TNPC) inverter comprising:
  a first direct current (DC) terminal and a second DC terminal;
  a first capacitor and a second capacitor electrically connected in series between the first and second DC terminals; and first, second and third circuitry legs, each of the first, second and third circuitry legs including i) switches electrically connected in series between the first and second DC terminals, and ii) a T-leg switch electrically connected between a point between the first and second capacitors and a point between the switches, wherein the T-leg switch is undersized compared to the switches, wherein the T-leg switch is undersized compared to the switches by the T-leg switch having less die area than a die area of each of the switches, and wherein the die area of the T-leg switch is at most about 20 percent of the die area of each of the switches.

2. The three-level TNPC inverter of claim 1, wherein each of the switches is an insulated-gate bipolar transistor (IGBT).

3. The three-level TNPC inverter of claim 2, wherein the T-leg switch comprises at least two T-leg switches arranged to perform blocking.

4. The three-level TNPC inverter of claim 2, wherein the T-leg switch comprises a bidirectional HEMT.

5. The three-level TNPC inverter of claim 4, wherein the T-leg switch is a GaN HEMT.

6. The three-level TNPC inverter of claim 1, wherein each of the switches is a metal-oxide-semiconductor field-effect transistor (MOSFET).

7. The three-level TNPC inverter of claim 6, wherein each of the switches is a silicon MOSFET.

8. The three-level TNPC inverter of claim 6, wherein each of the switches is a silicon-carbide MOSFET.

9. The three-level TNPC inverter of claim 1, wherein each of the switches is a HEMT.

10. The three-level TNPC inverter of claim 9, wherein the T-leg switch is a HEMT.

11. The three-level TNPC inverter of claim 10, wherein the T-leg switch comprises at least two T-leg switches arranged to perform blocking, and wherein the two T-leg switches are HEMTs.

12. The three-level TNPC inverter of claim 1, wherein the T-leg switch is undersized compared to the switches by the T-leg switch being implemented using fewer dies, or being implemented using smaller dies, or both, than each of the switches.

13. A three-level T-type neutral point clamp (TNPC) inverter comprising:

a first direct current (DC) terminal and a second DC terminal;

a first capacitor and a second capacitor electrically connected in series between the first and second DC terminals; and first, second and third circuitry legs, each of the first, second and third circuitry legs including i) switches electrically connected in series between the first and second DC terminals, and ii) a T-leg switch electrically connected between a point between the first and second capacitors and a point between the switches, wherein the T-leg switch is undersized compared to the switches, wherein the T-leg switch is undersized compared to the switches by the T-leg switch having a current rating that is lower than a current rating of each of the switches, and wherein the current rating of the T-leg switch is at most about 20 percent of the current rating of each of the switches.

14. The three-level TNPC inverter of claim 13, wherein the T-leg switch comprises a bidirectional HEMT.

15. The three-level TNPC inverter of claim 14, wherein the T-leg switch is a GaN HEMT.

16. The three-level TNPC inverter of claim 13, wherein each of the switches is a metal-oxide-semiconductor field-effect transistor (MOSFET).

17. The three-level TNPC inverter of claim 16, wherein each of the switches is a silicon MOSFET.

18. The three-level TNPC inverter of claim 16, wherein each of the switches is a silicon-carbide MOSFET.

19. The three-level TNPC inverter of claim 13, wherein each of the switches is a HEMT.

20. The three-level TNPC inverter of claim 13, wherein the T-leg switch is a HEMT.

21. The three-level TNPC inverter of claim 20, wherein the T-leg switch comprises at least two T-leg switches arranged to perform blocking, and wherein the two T-leg switches are HEMTs.

22. The three-level TNPC inverter of claim 13, wherein the T-leg switch is undersized compared to the switches by the T-leg switch being implemented using fewer dies, or being implemented using smaller dies, or both, than each of the switches.

* * * * *